United States Patent [19]

Doutrelepont

[11] 4,037,562

[45] July 26, 1977

[54] INSTALLATION FOR CONVEYING LIVING FISH PARTICULARLY ANAESTHETIZED FISH, IN AQUEOUS MEDIUM

[76] Inventor: Jean-Marie Doutrelepont, Bellevaux-Ligneuville, Belgium

[21] Appl. No.: 606,732

[22] Filed: Aug. 21, 1975

[30] Foreign Application Priority Data

Aug. 23, 1974 Belgium .............................. 819132

[51] Int. Cl.² ........................................... A01K 63/02
[52] U.S. Cl. ................................... 119/5; 261/121 M
[58] Field of Search ........................................ 119/2-5; 210/169; 261/121 M, 36 R, 77 R; 43/57

[56] References Cited

U.S. PATENT DOCUMENTS

| | | | |
|---|---|---|---|
| 2,863,653 | 12/1958 | Cummings | 261/36 R |
| 3,110,285 | 11/1963 | Greenough | 119/3 |
| 3,135,238 | 6/1964 | Eyl | 119/5 |
| 3,321,082 | 5/1967 | Willinger | 119/5 |
| 3,323,249 | 6/1967 | Randall | 43/57 |
| 3,381,822 | 5/1968 | Martin | 210/169 |
| 3,635,344 | 1/1972 | Lovitz | 210/169 |
| 3,687,111 | 8/1972 | Epper | 119/2 |
| 3,726,251 | 4/1973 | Fremont | 119/3 |

Primary Examiner—Louis G. Mancene
Assistant Examiner—Peter K. Skiff
Attorney, Agent, or Firm—Scully, Scott, Murphy & Presser

[57] ABSTRACT

There is described an installation for conveying in aqueous medium, living fish, particularly fish which have been anaesthetized, comprised of a tank and a device for supplying oxygen gas to the aqueous medium inside the tank, which comprises means so arranged as to cause an upward flow of the liquid in said medium.

34 Claims, 2 Drawing Figures

FIG.1

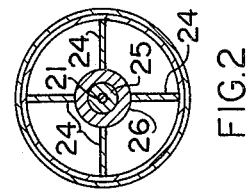
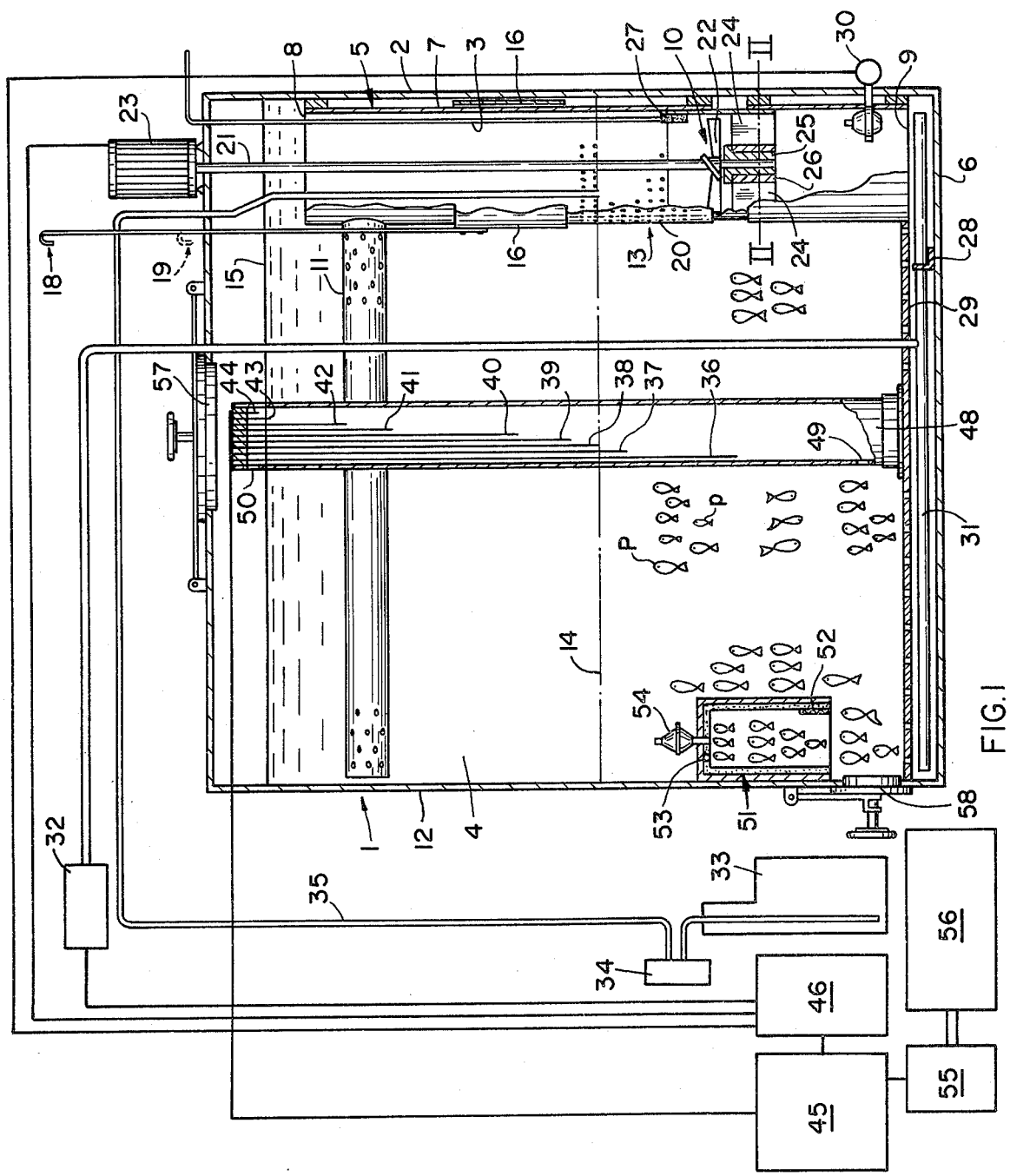

INSTALLATION FOR CONVEYING LIVING FISH PARTICULARLY ANAESTHETIZED FISH, IN AQUEOUS MEDIUM

This invention relates to an installation for conveying in aqueous medium, living fish, particularly fish which have been anaesthetized, which is comprised of a tank and a device for supplying oxygen gas to the aqueous medium inside the tank.

The conveying of anaesthetized fish is an art which has already been the subject of experimentation for a long time but which in spite of the ever-increasing requirement for conveying living fish from one location to another, never did enjoy a substantial development. Indeed, the devices for conveying anaesthetized fish which have been tested up to now have not yet been satisfactory because they have various substantial drawbacks, notably on the one hand the requirement for a very large volume of water relative to the fish load conveyed and on the other hand, causing a very high mortality among the fish due to the packing during the conveying. Indeed, when a very large load of anaesthetized fish is involved, it has been noticed that the fish after a few hours, settle at the bottom of the conveying tank and form a compact mass. In this way, the fish is incapable of breathing normally, the gills are blocked, the fish scales stick together and thus cause the fish to suffocate very rapidly. Moreover, with the conveying devices known up to now, it is impossible to obtain a regular and smooth oxygenation of the aqueous medium inside which the fish lie.

The invention has for an object to obviate these drawbacks and to provide an installation which is easily fitted on any conveying means and which is suitable for the conveying of living fish, particularly anaesthetized fish, over long distances, under any climate and at any time in the year. The installation according to the invention will moreover allow a substantial time saving for fish carriers, as they will no more have to change the fish water during the conveying as this was required with the present devices with which after some time the water was rapidly polluted and could cause the fish to die.

For this purpose according to the invention, the installation for conveying living fish, particularly anaesthetized fish, in aqueous medium, comprises means so arranged as to cause an upward flow of the liquid in said medium.

In another embodiment of the invention, said means comprise at least one circulation pump which is so arranged as to suck the liquid from the tank top portion and to force said liquid back adjacent the tank bottom.

In an advantageous embodiment of the invention, the circulation pump comprises a duct connected to the tank and comprising the pump body, said duct being open at both ends thereof, the duct top end lying below the liquid level and the duct bottom end lying adjacent the tank bottom, as well as means dipping into the liquid and so arranged in the duct as to cause a liquid flow from the tank top portion to the tank bottom portion.

In another advantageous embodiment of the invention, the circulation pump comprises a duct connected to the tank and comprising the pump body, said duct being closed at the top end thereof and open at the bottom end thereof, the duct top end lying either above or below the liquid level and the duct lower end lying adjacent the tank bottom, a port lying below the liquid level inside the tank being connected to said duct and opening therein to cause the liquid to flow from the tank top portion to the tank lower portion.

In a peferred embodiment of the invention, said means for causing the liquid to flow from the tank top portion to the tank lower portion are comprised of a screw mounted on a shaft co-axial with the duct and driven by a motor located outside said aqueous medium, said screw being arranged between the port substantially equally spaced from the liquid level inside the tank and the tank bottom, and said tank bottom.

In a particularly advantageous embodiment, the device for supplying oxygen gas has the outlet thereof adjacent the screw and at a level somewhat higher than the screw level.

The invention also relates to a conveying vehicle provided with said installation.

Other details and features of the invention will stand out from the description given below by way of non limitative example and with reference to the accompanying drawings, in which:

FIG. 1 is a diagrammatic view in elevation and in cross-section, of an installtion for conveying in aqueous medium, anaesthetized fish according to the invention, as associated with a conveying vehicle.

FIG. 2 is a cross-section along lines II—II in FIG. 1, drawn to a larger scale.

In the various figures, the same reference numerals pertain to similar elements.

The installation 1 as shown in FIG. 1, for conveying anaesthetized fish in aqueous medium, comprises a tank 2 covered with an insulating material as well as a duct 3 for supplying oxygen gas to the aqueous medium 4 inside tank 2, said duct being connected to an oxygen bottle or tank. The installation 1 is provided with means so arranged as to cause an upward flow of the liquid in medium 4, for example a circulation pump 5 sucking the liquid in the top portion of tank 2 and discharging same adjacent tank bottom 6. Said pump 5 comprises a cylindrical duct 7 connected to tank 2, closed at the top end 8 thereof and closed at the bottom end 9 thereof, as well as a screw 10 dipping into the liquid and arranged inside duct 7. The suction header 11 of pump 5, comprised of a perforated tube lying horizontally relative to tank bottom 6, between pump duct 7 and side wall 12 of the tank, lies below the liquid level 15 inside the tank 2. The top end 8 of pump cylindrical body 7 lies somewhat below liquid level 15 inside tank 2, while the discharge outlet at bottom end 9 thereof lies adjacent bottom 6 of tank 2.

The pump 5 comprises a port 13 lying somewhat lower than level 14 with an equal spacing from liquid level 15 inside tank 2 and tank bottom 6. Said header 13 is comprised of a port provided in duct 7 of pump 5, a movable duct 16 co-axial with cylindrical duct 7 and operated by a control handle 18 arranged outside the tank so as to allow closing said port 13 by sliding the movable duct 16 over pump duct 7 along the axis thereof. When the movable duct 16 is lowered, the handle 18 takes that position 19 shown in dot-and-dash lines in FIG. 1. A grid-like element 20 with a cross-section area substantially equal to the area of duct 7 of pump 5 and fastened thereto, is fitted inside port 13. Said grid-like element 20 has for its purpose to prevent the fish clogging the suction port 13.

The screw 10 mounted on a shaft 21 co-axial with duct 7 and arranged between the port secondary header 13 and the bottom 6 of tank 2, comprises a plurality of blades so as to force efficiently the liquid towards tank bottom 6, two such blades being shown in 22. Said screw 10 is driven by a variable-speed electric motor 23 which is arranged outside the aqueous medium. A slow speed is provided to avoid sucking air in the liquid inside tank 2, which could cause some oxygen to be forced from the liquid to the surface thereof and thus cause deoxygenating thereof, a high speed driving the screw to cause an upward movement of the liquid inside the aqueous medium.

As more particulrly shown in FIG. 2, flat elements 24 going through the axis of duct 7 and regularly distributed therein below screw 10, allow to obtain a laminar liquid flow inside duct 7 and thus to avoid swirling adjacent screw 10 inside duct 7, which would cause a substantial head loss inside duct 7. To prevent substantial vibrating of shaft 21 of screw 10, the lower end of said shaft 21 is received in a bearing 25 which fits inside a tube 26 co-axial with shaft 21 of screw 10, said tube 26 being retained by flat elements 24.

According to the invention, duct 3 for supplying oxygen gas has the outlet thereof adjacent and directly above screw 10, which divides the oxygen gas into micro-bubbles while mixing same with the circulating liquid to form an absolutely homogeneous mixture of liquid and oxygen, thus allowing to obtain an uniform and smooth oxygenating of the whole liquid volume inside tank 2 where fishes P lie. For this purpose, a diffuser 27 is fitted over the outlet of oxygen-supply duct 3.

A projecting element 28 located outside cylindrical duct 7 for preventing eddies in the liquid flow between the lower end 9 of duct 7 and the bottom 6 of tank 2, which could cause some mortality rate among the fishes lying in this area, is fastened to the bottom 6 of tank 2 adjacent the lower end 9 of the pump cylindrical duct 7. A perforated plate 29 for distributing the upward flow of the liquid inside the whole tank 2, is arranged adjacent tank bottom 6 and extends over the whole surface thereof with an uniform spacing from said bottom, the lower end 9 of the pump cylindrical duct 7 lying below said perforated plate 29. The spacing between bottom 6 of tank 2 and perforated plate 29 is slightly larger than the height of element 28, said element 28 having a length substantially equal to the diameter of the pump cylindrical duct 7.

The tank 2 is provided with a device 30 for filling the tank with water as well as with a refrigerating device allowing to adjust the temperature of the liquid contained inside said tank, for example a coil 31 arranged on tank bottom 6 below perforated plate 29. Said coil 31 through which flows a refrigerating fluid is connected to a refrigerating unit 32.

A tank 33 for a solution of anaesthetizing agent or sedative, a device 34 for pumping said solution and a pipe 35 for feeding said solution to tank 2 allow to meter the anaesthetizing or sedative solution in the aqueous medium. According to the invention, elements 36 to 44 with different lengths and adjustably mounted inside tank 2, are arranged therein to dip in sequence in the aqueous medium according to the tank filling level, the element 36 being connected to the ground of a measuring circuit 45 associated with a control circuit 46, the elements 37 to 44 also connected to said measuring circuit 45, acting on the metering means according to the liquid level inside tank 2. The element 37 has also for its purpose to close the water-filling device 30 and to switch-over to the slow speed the electric motor 23 driving screw 10, the element 42 to switch-over to the fast speed the electric motor 23 driving screw 10, and the element 44 to act upon a device for loading fishes in the tanks, arranged outside installation 1, so as to prevent such loading according to the filling level inside tank 2. A housing 48 provided with two openings 49 and 50 at the bottom and top ends thereof respectively surrounds elements 36 to 44, the height difference between the lower ends of two immediately adjacent elements from the series of elements 37 to 40 or 41 to 44 being substantially equal, the lower end of element 37 lying at a level somewhat lower than level 14 lying at the same distance from liquid level 15 inside the tank and tank bottom 6. The height difference between the lower end of element 40 and the lower end of element 41, is higher than the height difference between the lower ends of two directly adjacent elements from the same series.

The movable duct 16 is raised by sliding same over the cylindrical body 7 of pump 5 by means of the control handle 18 in such a way that water can enter pump body 7 through port 13. Water is fed to the tank 2 by means of the filling device 30. The water enters the housing 48 through the opening 49 thereof, contacts the lower end of element 36, then the lower end of element 37 which transmits a pulse. The pumping device 34 of tank 33 for the anaesthetizing or sedative solution responding to said pulse automatically supplies through pipe 35, a determined amount of anaesthetizing or sedative solution to tank 2, the filling device 30 stops and the slow speed of electric motor 23 driving screw 10 is operated. The gas oxygen supply device is opened, the oxygen being fed through diffuser 27 into the liquid inside tank 2. Said tank 2 is then ready to receive the fish. When the fish are dumped into the tank, the liquid level rises. According to the fish load dumped-in, the liquid level will reach the elements 38, 39, 40, 41, etc., and an additional dose of anaesthetizing or sedative solution will automatically be fed each time to the liquid inside tank 2. There results therefrom that the amount of anaesthetizing or sedative solution which will be fed by the pumping device 34 of anaesthetizing or sedative solution tank 33 will be dependent on the height of the water level inside the tank and will thus be proportional to the amount of fish loaded in the tank. Moreover when the liquid level reaches element 42, the fast speed of electric motor 23 driving screw 10 is automatically operated so as to obtain an upward flow of the liquid in the aqueous medium inside tank 2. Once the liquid will have reached a level high enough to enter port 11 of pump 5, header 13 will be closed by lowering duct 16 by means of handle 18. If the fish are loaded inside tank 2 by means of an automatic loading device the element 44 when the liquid inside tank 2 reaches the lower end thereof, automatically stops said device.

A cell 51 lined with an insulating material, made fast to tank 2, containing some fish, dipping into the liquid inside tank 2, the top end of said cell being closed and the lower end thereof being open, a resistor 52 for heating the liquid inside the cell as well as an electric control device 53 responding to the fish movements inside the cell 51, cooperate with the metering means for the anaesthetizing or sedative solution in the aqueous medium. A valve 54 is arranged on the top end of cell 51 so as to let the liquid from tank 2 flow through the cell.

Resistor 52 is energized in cell 51 to raise the liquid temperature therein. Due to this raise in temperature the anesthetized fish inside said cell have a tendency to wake up. If none of the fish inside cell 51 does move after a determined period of time, the electric device 53 the cell 51 is fitted with stops the pumping device 34 of the anaesthetizing or sedative solution tank for some time, notably when said device goes on feeding a determined dose of anaesthetizing or sedative product per time unit during the conveying. On the other hand, if some fish begins to wake up and moves, such movement will be recorded by electric device 53 of the cell the fish lies in, which will close the contact again and energize the pumping device 34 which will supply a determined additional amount of anaesthetizing or sedative solution to tank 2.

Once the anaesthesia has been monitored, valve 54 will open and the liquid inside tank 2 can flow again through cell 51.

The power required for operating the installation according to the invention is supplied by an alternator 55 which converts the mechanical power from a diesel engine 56 into electric power.

An opening device 57 for the fish load is arranged on the top portion of tank 2. Said device 57 is comprised of a lid, with an opening provided therein to let the gases formed inside the tank and the biological residues from the fish escape. A device 58 for unloading the fish is arranged on the side surface 12 of tank 2, adjacent the bottom 6 thereof.

As already stated, the installation according to the invention prevents the fish dying from suffocation due to packing, by means of a liquid stream flowing from the tank top portion to the tank bottom portion. Said water flow with a constant pressure, distributes the major portion of the fish as shown in FIG. 1, that is either head down and tail up, or tail down and head up. In the first case, the oxygen-rich water goes through the fish mouth, reaches the branchiae and comes out through the gills. In the second case, the water comes in through the gills, oxygenates the branchiae and comes out through the mouth. Moreover, the oxygen-rich water flows around each fish, which allows a perfect oxygenating of the complete breathing system of the fish (skin + branchiae).

As shown in FIG. 1, the loading with large fish P requires the addition of smaller fish p. The small-size fish have for purpose to close the intervals between the bigger fish. The small-size fish could possibly be replaced by materials with a density higher than water.

It must be understood that the invention is in no way limited to the above embodiments and that many changes can be brought therein without departing from the scope of the invention as defined by the appended claims.

claim:

1. Installation for conveying in aqueous medium, living fish, particularly fish which have been anaesthetized, comprised of a tank and a device for supplying oxygen gas to the aqueous medium inside the tank, which comprises at least one circulation pump to cause an upward flow of the liquid in said medium, said circulation pump being arranged to suck the liquid from the tank top portion and to force said liquid back adjacent the tank bottom, said circulation pump comprising a duct connected to the tank and comprising the pump body, said duct being open at both ends thereof, the duct top end lying below the liquid level and the duct bottom end lying adjacent the tank bottom, as well as means dipping into the liquid and so arranged in the duct as to cause a liquid flow from the tank top portion, said means comprising a port substantially equally spaced from the liquid level inside the tank and the tank bottom, a screw mounted on a shaft co-axial with said duct and driven by a motor located outside said aqueous medium, said screw arranged between said port and said tank bottom, said device for supplying oxygen gas has the outlet thereof adjacent said screw at a level somewhat higher than said screw level, said motor is a varying-speed motor having at least one slow speed provided to drive said screw to prevent the suction of oxygen gas into the liquid inside said duct, and a high speed driving said screw to effect upward flow in said medium to the tank bottom portion.

2. Installation as claimed in claim 1, which comprises means arranged below said screw to generate a laminar flow of the liquid inside said duct.

3. Installation as claimed in claim 2, in which said means below said screw are comprised of flat elements going through the axis of the pump duct and equally distributed therethrough.

4. Installation as claimed in claim 1, in which the header substantially equally spaced from the liquid level inside the tank and the tank bottom is comprised of an opening provided substantially over the whole circumference of the pump duct.

5. Installation as claimed in claim 4, which comprises a movable duct co-axial with the pump duct, allowing to seal said opening by sliding the movable duct over the pump duct along the axis thereof as well as means for controlling said movable duct.

6. Installation as claimed in claim 4, in which the pump duct comprises a grid-like element with an area substantially equal to the duct cross-section area, which is fitted in said opening.

7. Installation as claimed in claim 1, which comprises means located adjacent the tank bottom and the lower end of said pump duct, said means being so arranged as to prevent eddies in the liquid flow between the lower end of the pump duct and the tank bottom.

8. Installation as claimed in claim 1, which comprises a perforated plate arranged adjacent the tank bottom and extending over the whole surface thereof substantially at the same distance from the bottom, the lower end of the pump duct being located below the perforated plate level.

9. Installation as claimed in claim 8 in which said means arranged adjacent the tank bottom and the lower end of the pump duct are comprised of a projecting element fastened to the tank bottom between said bottom and said perforated plate, said element lying outside said duct, the element being of a length at least equal to the length of pump duct extending in parallel relationship with said element, the element extending over a substantial distance between the bottom and said perforated plate.

10. Installation as claimed in claim 1, which comprises a device for refrigerating the aqueous medium.

11. Installation as claimed in claim 1, in which said device for supplying gas oxygen comprises a diffuser fitted to the outlet thereof.

12. Installation as claimed in claim 1, in which said tank comprises an opening device for loading the fish, said device being comprised of a lid arranged on the top portion of said tank, an outlet being provided in said cover to let the gases generated inside the tank and the biological residues produced by the fishes escape, a device for unloading the fish as well as a device for filling the tank with water.

13. Installation as claimed in claim 1, which comprises means for metering the anaesthetizing or sedative solution in the aqueous medium.

14. Installation as claimed in claim 13, which comprises means acting on said metering means according to the filling rate of the liquid inside said tank.

15. Installation as claimed in claim 13, in which said metering means comprise a tank for the anaesthetizing or sedative solution, a pumping device for said solution and a pipe for feeding said solution to the fish tank.

16. Installation as claimed in claim 14, in which said means acting on said metering means according to the tank liquid filling rate, comprise two electrical sensing means having probes of different lengths and so arranged in the tank as to dip in sequence into the aqueous medium according to the tank filling rate.

17. Installation as claimed in claim 16, in which the lower end of the longest element reaches a level which is at least equally spaced from the liquid level inside the tank and from said tank bottom.

18. Installation as claimed in claim 16, in which the height difference between the lower ends of two directly adjacent elements from the same series is substantially equal.

19. Installation as claimed in claim 18, in which the height difference between the lower end of the shortest element in the first series and the lower end of the longest element directly adjacent in the second series is higher than the height difference between the lower ends of two directly adjacent elements from the same series.

20. Installation as claimed in claim 19, which comprises at least one element among the elements from the first series which is so arranged as to close the device for filling said tank with water according to the tank filling rate.

21. Installation as claimed in claim 19, which comprises at least one element among the elements in the first series which is so arranged as to operate the slow speed of the screw-driving motor according to the tank liquid filling rate.

22. Installation as claimed in claim 19, which comprises at least one element among the elements in the second series which is so arranged as to operate the fast speed of the screw-driving motor according to the tank liquid filling rate.

23. Installation as claimed in claim 19, which comprises an element among the elements in the second series which acts on a device for loading fish into the tank arranged outside said installation, in such a way as to prevent said loading according to the tank liquid filling rate, said element being the shortest element in the second series.

24. Installation as claimed in claim 16, in which said elements are adjustably mounted inside said tank.

25. Installation as claimed in claim 16, which comprises a housing enclosing said elements, said housing being provided with at least two openings at the lower and top ends thereof respectively.

26. Installation as claimed in claim 13, which comprises means so arranged as to monitor the proportion of anaesthetizing or sedative product in the tank liquid.

27. Installation as claimed in claim 26, in which said monitoring means comprise at least one cell the top end of which is closed and the lower end of which is open, with a volume large enough to contain at least one fish, said cell being so arranged as to dip in the tank liquid, means for exciting the fish inside said cell, and an electric control device responding to the fish movements inside the cell, said control device cooperating with said metering means.

28. Installation as claimed in claim 27, in which said exciting means are comprised of a device for heating the liquid inside said cell.

29. Installation as claimed in claim 27, in which said cell comprises an opening device so arranged on the top thereof as to allow the flow of liquid from the tank through the cell.

30. Conveying vehicle provided with at least one installation as claimed in claim 1.

31. Installation for conveying in aqueous medium, living fish, particularly fish which have been anaesthetized, comprised of a tank and a device for supplying oxygen gas to the aqueous medium inside the tank, which comprises at least one circulation pump to cause an upward flow of the liquid in said medium, said circulation pump being arranged to suck the liquid from the tank top portion and to force said liquid back adjacent the tank bottom, said circulation pump comprising a duct connected to the tank and comprising the pump body, said duct being closed at the top end thereof and open at the bottom end thereof, the duct top end lying at a level other than the liquid level in the tank and the duct lower end lying adjacent the tank bottom, a suction header lying below the liquid level inside the tank being connected to said duct and opening therein to cause the liquid to flow from the tank top portion to the tank lower portion, said means comprising a port substantially equally spaced from the liquid level inside the tank and the tank bottom, a screw mounted on a shaft co-axial with said duct and driven by a motor located outside said aqueous medium, said screw arranged betwween said port and said tank bottom, said device for supplying oxygen gas has the outlet thereof adjacent said screw at a level somewhat higher than said screw level, said motor is a varying-speed motor having at least one slow speed provided to drive said screw to prevent the suction of oxygen gas into the liquid inside said duct, and a high speed driving said screw to effect upward liquid flow in said medium.

32. Installation as claimed in claim 31, in which said suction header is comprised of a perforated tube extending substantially horizontally over a distance correponding at least to the smallest distance between two opposite side walls of the tank.

33. Installation as claimed in claim 31, in which the duct top end lies above the liquid level.

34. Installation as claimed in claim 31, in which the duct top end lies below the liquid level.

* * * * *

UNITED STATES PATENT OFFICE
CERTIFICATE OF CORRECTION

Patent No. 4,037,562                    Dated July 26, 1977

Inventor(s) Jean-Marie Doutrelepont

It is certified that error appears in the above-identified patent and that said Letters Patent are hereby corrected as shown below:

Col. 2, line 66, delete "secondary header".

Col. 4, line 55, following "51", insert -- is --;
    lines 56 and 57, delete "containing some fish, dipping into the liquid inside tank 2,";
    line 58, change the comma (,) to a period (.);
    line 58, change "a" to -- A --;
    line 58, following "52" insert -- is included --;
    line 61, delete the comma (,), and insert therefor -- These electrical devices --;
    line 61, change "for" to -- to control the introduction of --.

In claim 1: at column 5, line 67, following "portion" insert --to the tank bottom portion --;
    at column 6, line 12, delete "to the tank bottom portion".

In claim 31, at column 8, line 44, change "betwween" to -- between --.

In claim 32, at column 8, line 55, change "reponding" to -- responding --.

Signed and Sealed this

Fourteenth Day of March 1978

[SEAL]

Attest:

RUTH C. MASON
Attesting Officer

LUTRELLE F. PARKER
Acting Commissioner of Patents and Trademarks